June 16, 1964   D. J. KROON ETAL   3,137,813
DEVICE FOR RECORDING NUCLEAR RESONANCE SPECTRA
Filed Oct. 17, 1960
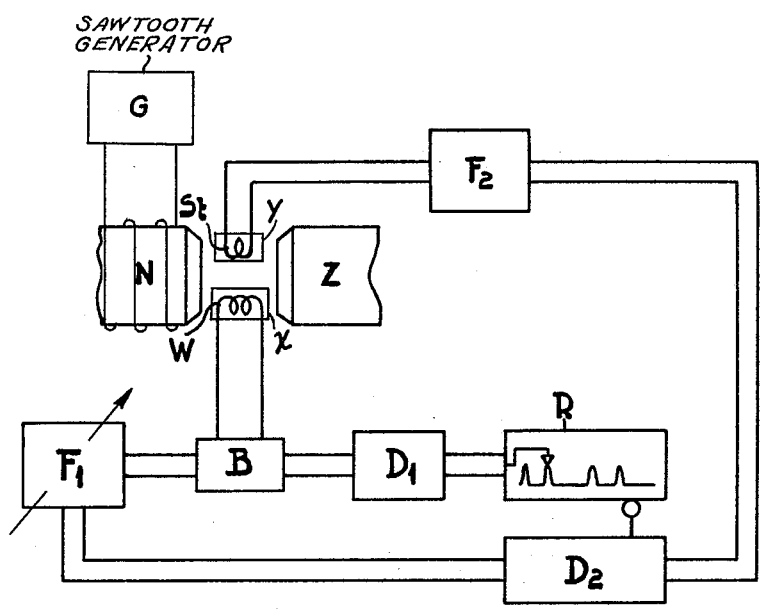
INVENTOR
Dirk J. Kroon
Jan Volger
BY Frank R. Trifari
AGENT

United States Patent Office 3,137,813
Patented June 16, 1964

3,137,813
DEVICE FOR RECORDING NUCLEAR
RESONANCE SPECTRA
Dirk Jan Kroon and Jan Volger, Eindhoven, Netherlands, assignors to North American Philips Company, Inc., New York, N.Y., a corporation of Delaware
Filed Oct. 17, 1960, Ser. No. 63,051
Claims priority, application Netherlands Oct. 20, 1959
8 Claims. (Cl. 324—.5)

This invention relates to devices for recording nuclear resonance spectra and, more particularly, to certain improvements therein.

The aforementioned devices are commonly employed in nuclear magnetic and electron paramagnetic spectroscopy. In such devices, a sample to be investigated is subjected to the influence of a first magnetic field, whose lines of force remain in a substantially constant direction, and a second magnetic field, whose lines of force are alternating in direction at a high frequency. The lines of force of the second field are disposed preferably at substantially right angles to those of the first-mentioned field. A means for determining the energy absorbed by the atomic nuclei is provided, it being possible to vary the intensity of the first mentioned field and/or the frequency of the second field so that the absorption can be determined as a function of one of these magnitudes. The theory and operation of such devices has been adequately treated in the literature (see, for example, "NMR and EPR Spectroscopy" by various members of the NMR-EPR Staff of Varian Associates and published by Permagon Press, 1960) and is well known to those skilled in the art. In some such devices, a curve representing this function, i.e., energy absorption versus field intensity or frequency, is preferably recorded automatically on recording paper, which is caused to be moved in proportion, i.e., in response, to the variation in the field or the frequency during the measurement of the absorption. The driving device for the recording paper, in such cases, is simply coupled mechanically to an element which causes the adjustment or variation of the field intensity or the frequency, respectively, depending upon which parameter is selected to provide the aforementioned measurement. As is well known to those skilled in the art, the recording paper is generally calibrated along an axis selected to be in parallel with the direction of its movement in appropriate units of the parameter selected for making the measurement. Thus, a given length of axis is chosen to correspond to the range through which the field intensity, or the frequency, is varied, and if a periodic variation is provided respective successive lengths of the axis are provided for each respective period of the variation. A stylus or pen, which is responsive to a signal proportional to the energy absorption being measured, is adapted to be in contact with the surface of the recording paper and generally records or registers a distinctive mark when the atomic nuclei of the sample being investigated is placed into resonance by the varying parameter, the location of the mark on the graph or recording paper being indicative of the field strength, or frequency, which causes the sample to be placed into the aforementioned resonance.

The absorption spectra obtained with such a device provide information about the structure formula of a material to be investigated. The spectra of liquid compounds usually show a large number of very closely adjacent peaks each corresponding to a given nuclear resonance. These are points at which the absorption shows a maximum and the corresponding line of the diagram is thus referred to as the absorption line. If the molecule contains atoms positioned in different ways, this may give rise to a plurality of absorption lines. Thus there is provided a means for the rapid qualitative chemical analysis of various substances by means of the absorption spectra obtainable in a manner to be described.

In order to permit sufficient distinction between the various lines, in recording a spectrum it is necessary for the first-mentioned magnetic field and/or the frequency of the second magnetic field to be varied extremely slowly when traversing the absorption range. Accidental variations in these magnitudes, which may be attributable, for example, to temperature variations, have a very disturbing influence and with each adjustment the field intensity and the frequency are therefore stabilized as well as possible on the desired value.

This stabilization is often not sufficient and an object of the invention is to provide means for obtaining spectra which are accurate and reproducible without accurate stabilization of the field and the frequency being required.

The invention consists in placing also a standard preparation in the aforesaid first magnetic field, which in combination with a generator for high-frequency oscillations which, due to the nuclear resonance in the standard preparation, provides a voltage of the nuclear-resonance frequency. This oscillation voltage is compared with an alternating voltage having a frequency equal to that of the high-frequency field which acts upon the preparation to be investigated, so as to obtain a correcting voltage which depends upon the frequency difference and serves to correct the location of the absorption peaks in the spectrum. Thus, use is made of the fact that, for a given intensity of the first-mentioned magnetic field, such a standard preparation has a very determined nuclear-resonance frequency which may serve as a reference frequency for the high frequency oscillation generator associated with the standard preparation. Therefore, as the intensity of the first mentioned magnetic field is varied, the nuclear-resonance frequency of the standard preparation varies proportionally, thereby providing a varying reference frequency.

When the absorption is recorded on a moving paper strip, a voltage derived from the device for comparing the two alternating voltages may directly serve to drive the paper strip in a manner such that the distance covered by the paper strip is proportional to the difference between the frequencies of the two voltages. Instead of on recording paper, an image could be produced on the screen of an oscillograph. In this case, the time-base displacement must be proportional to the difference between the frequencies. If the field strength is slowly varied in linear relationship to time, and if unwanted variations in the field intensity and the frequency are assumed not to occur, the frequency difference is linear with time and either the paper moves at uniform speed, or the luminous spot of the galvanometer displaces itself at a uniform speed. If an accidental variation in the field occurs, it causes the frequency of the generator to be varied correspondingly, resulting in a voltage by means of which the position of the paper or the location of the luminous spot is corrected.

A spectrum is thus obtained which represents the absorption peaks as a function of field strength in a reproducible manner.

It is similarly possible to obtain an absorption spectrum by choosing the frequency of the second field as the independent variable, accidental variations in the field intensity and the frequency being corrected in a similar manner so that the location of the absorption peaks on the frequency axis are recorded at the proper points.

In order that the invention may be readily carried into effect, one embodiment thereof will now be described in detail, by way of example, with reference to the accompanying diagrammatic drawing.

A voltage of high frequency, for example, 30 mcs./sec., which voltage lies in the range of the nuclear-resonance frequencies to be investigated, is produced in a suitable generator device $F_1$. The output frequency of oscillator $F_1$ may be held substantially constant or it may be linearly varied with time by means of suitable control circuits, not shown, but which are well known. In a first embodiment of the invention, the frequency of device $F_1$ is maintained substantially constant. By means of this voltage, a high-frequency alternating field is produced, via a device B which may, for example, comprise an inductance bridge network, in a coil W thereof. This coil W is located in a constant unidirectional magnetic field between the poles N–Z so that the lines of force of the alternating field produced by an A.C. current in coil W and those of the constant field N–Z are substantially at right angles to one another. A sawtooth wave generator G coupled to a field winding asociated with the magnetic core of the field producing means N-Z provides a means for slowly varying the field strength of the substantially constant field N-Z over a given range, as shown.

Placed in the fields is a sample X to be investigated which shows, i.e., experiences, a sudden increase in absorption of energy at a given value of field strength as the latter is being varied through the aforesaid given range. Consequently, the output voltage of the oscillator $F_1$ is modulated in the device B by a resultant voltage which is induced in the winding W as the nuclei of the sample absorbs energy. In turn, the modulated voltage is demodulated in a detector $D_1$. The demodulator $D_1$ provides an indicating signal which is supplied, for example in the form of a direct voltage, to a measuring instrument which is responsive thereto and combined with a recording device R such as, for example, a pen which is responsive to the indicating signal and in contact with a moving paper strip, and illustrated schematically in the drawing.

In the N–Z field there is also placed, in a coil $S_t$, a standard sample Y consisting, for example, of water, which has an absorption peak in the same frequency range as that of the sample being investigated. The device $F_2$, which may comprise, for example, a spin generator, as disclosed in an article in the Review of Scientific Instruments, vol. 30, January 1959, pages 41–42, by Richard J. Blume, entitled "Some Properties of Spin Generators," some of the details of which have been omitted from the drawing for the sake of clarity. Spin generator $F_2$ produces a high-frequency alternating voltage of a frequency which is equal to the frequency at which the standard sample shows a nuclear absorption peak. Device $F_2$ and, more particularly, the spin generator, as is well known to those skilled in the art, is an electronic generator which provides a signal having a frequency that is directly controlled by the Larmor precession of nuclei of the standard sample which is placed in the feedback path of the oscillator. The output voltage of the device $F_2$ is combined with a voltage originating from the device $F_2$, resulting in a voltage of the difference frequency. From this voltage there is derived, by means of a known discriminator $D_2$, a direct voltage which is proportional to frequency and which directly drives the paper strip in the recording instrument R so that the displacement of the paper strip is proportional to this voltage, or in other words, to the difference frequency. In case of an accidental variation in the frequency of the device $F_1$ or an unwanted variation in the field N–Z, the voltage for driving the recording instrument is corrected so that any absorption peak occurring is nevertheless recorded in the correct way. In practice, as the intensity of the D.C. field NZ is linearly varied during a scanning period, the frequency of device $F_2$ varies proportionally. If the linear variation in the NZ field is disturbed for any reason, for example, by temperature variations, the frequency of device $F_2$ will be correspondingly varied. The output voltage of discriminator $D_2$, which is proportional to the difference in frequencies supplied to it by devices $F_1$ and $F_2$, will change proportionally also. The displacement of the recorder R along its X-axis will therefore be corrected so that the absorption peaks produced by the unknown specimen in field W, which cause the Y-axis deflection of recorder R, will be recorded at the proper points along the X-axis despite such unwanted variations in the NZ field. Similarly, if the frequency of the oscillator $F_1$ should drift slightly during a scanning period, the output voltage of discriminator $D_2$ will be proportionally changed so as to correct the displacement or recorder R so that the absorption peaks are again correctly recorded.

In an alternative embodiment of the invention, the NZ field may be maintained constant, for example, by disconnecting or deenergizing sawtooth generator G, and the frequency of the alternating field W may be linearly varied with time by means of variable frequency oscillator $F_1$. The difference frequency between $F_1$ and $F_2$ is again used to displace recorder R via discriminator $D_2$ to produce a nuclear resonance spectrum. In this embodiment also, accidental or unwanted variations in the frequency of device $F_1$ or in the intensity of the NZ field will cause a corresponding variation in the output of discriminator $D_2$ so that the absorption peaks are nevertheless correctly recorded.

What is claimed is:

1. A device for recording nuclear resonance spectra of a given sample, said device comprising first magnetic field producing means having flux lines in a substantially constant predetermined direction, second magnetic field producing means having flux lines alternating at a high frequency in a direction substantially normal to said predetermined direction, means for varying at least one of the predetermined respective parameters of said first and second field producing means, said parameters comprising the field intensity of said first field producing means and the frequency of said second field producing means, respectively, said given sample being adapted to be disposed in the fields of said first and second field producing means, a first signal generator to provide a first signal having a predetermined first frequency, means for modulating said first signal in accordance with the energy absorbed by said given sample disposed in said fields, means to demodulate said modulated first signal to provide an output signal proportional thereto, a reference sample adapted to be disposed in the field produced by said first magnetic field producing means, a second signal generator responsive to the energy supplied by the nuclear procession of said reference sample to provide a second signal having a second frequency different from said first frequency, means to compare said first and second signals to provide a control signal proportional to the difference in said first and second frequencies, and indicating means comprising means to record said output signal, said means to record being responsive to said control signal.

2. A device according to claim 1, wherein said indicating means comprises a stylus responsive to said output signal and said means to record comprises a calibrated recording strip having a surface adjusted to be in contact with said stylus and adapted for movement in response to said control signal.

3. Apparatus for recording nuclear resonance spectra of a sample of matter comprising means for detecting the energy absorbed by the atomic nuclei of said sample and producing a characteristic signal in accordance with said absorbed energy, said latter means including means for producing a varying magnetic field comprising means for producing a first magnetic field and means for producing a second magnetic field alternating at a high frequency, said sample being disposed within said first and second magnetic fields, means for varying at least one of the predetermined respective parameters of said first and second field producing means, said parameters comprising the field intensity of said first field producing means and the frequency of said second field producing means, respectively, means for indicating the energy absorbed by the nuclei of said sample as a function of whichever one of the field parameters that is varied, means for applying said characteristic signal as a first input to said indicating means, first signal generator means for providing a first signal having a first frequency correlated to the frequency of said second field, a reference sample disposed within said first magnetic field, means for producing a second signal having a second frequency which is correlated to the nuclear resonance frequency of said reference sample, means for combining said first and second signals to derive a control signal proportional to the difference of said first and second frequencies, and means for applying said control signal as a second input to said indicating means for deflecting said indicating means proportional thereto.

4. Apparatus for recording nuclear resonance spectra of a sample of matter comprising means for producing a first magnetic field of substantially constant intensity, means for producing a second magnetic field alternating at a high frequency, said sample being disposed within said first and second magnetic fields, means for varying at least one of the predetermined respective parameters of said first and second field producing means, said parameters comprising the field intensity of said first field producing means and the frequency of said second field producing means, indicating means for indicating the energy absorbed by the nuclei of said sample as a function of the one of said parameters being varied, first signal generator means for providing a first signal having a first frequency, means for obtaining a characteristic signal in accordance with the energy absorbed by said sample, a reference sample disposed within said first magnetic field, means for producing a second signal voltage of a second frequency which is correlated to the nuclear resonance frequency of said reference sample, means for combining said first and second signals to derive a control signal proportional to the difference in said first and second frequencies, said indicating means being responsive to said control signal to produce a deflection thereof proportional to said control signal.

5. Apparatus for recording nuclear resonance spectra of a sample of matter comprising means for producing a first unidirectional magnetic field of substantially constant intensity, means for producing a second magnetic field alternating at a high frequency and substantially orthogonal to the direction of said first field, said sample being disposed within said first and second magnetic fields, means for varying at least one of the predetermined respective parameters of said first and second field producing means, said parameters comprising the field intensity of said first field producing means and the frequency of said second field producing means, means for recording the energy absorbed by the nuclei of said sample as a function of the one of said parameters being varied, said recording means having first and second input terminals for causing deflection of said recording means along first and second mutually perpendicular axes, means for generating a first signal of a first frequency equal to the frequency of said alternating magnetic field, means for detecting the energy absorbed by the atomic nuclei of said sample and producing a characteristic signal in accordance with said absorbed energy, means for applying said characteristic signal to the first input terminal of said recording means to cause a displacement along said first axis proportional to said signal, a reference sample disposed within said first magnetic field, means for producing a second signal of a second frequency which is correlated to the nuclear resonance frequency of said reference sample, means for comparing said first and second signals to derive a control signal proportional to the difference of said first and second frequencies, means for applying said control signal to the second input terminal of said recording means to cause a displacement along said second axis proportional to said control signal thereby to automatically correlate the recording of the absorption peaks to the absolute values of the parameters of said first and second magnetic fields produced.

6. Apparatus for recording nuclear resonance spectra of a sample of matter comprising means for producing a first unidirectional magnetic field of substantially constant intensity, means for producing a second magnetic field alternating at a high frequency and substantially orthogonal to the direction of said first field, said sample being disposed within said first and second magnetic fields, means for linearly varying the intensity of said first field with time, means for recording the energy absorbed by the nuclei of said sample as a function of said field intensity, means for generating a first signal having a frequency correlated to the frequency of said second field, means for detecting the energy absorbed by the atomic nuclei of said sample and producing a characteristic signal in accordance with said absorbed energy, means for applying said characteristic signal as a first input to said recording means, a reference sample disposed within said first magnetic field, means for producing a second signal having a second frequency which is correlated to the nuclear resonance frequency of said reference sample, means for combining said first and second signals to derive a control signal proportional to the difference of said first and second frequencies, and means for applying said control signal as a second input to said recording means for causing a displacement of said recording means along one axis thereof.

7. Apparatus for recording nuclear resonance spectra of a sample of matter comprising means for producing a first unidirectional magnetic field of substantially constant intensity, means for producing a second magnetic field alternating at a high frequency and substantially orthogonal to the direction of said first field, said sample being disposed within said first and second magnetic fields, means for linearly varying the frequency of said second field with time, means for recording the energy absorbed by the nuclei of said sample as a function of said field frequency, means for generating a first signal having a varying frequency correlated to the frequency variations of said second field, means for detecting the energy absorbed by the atomic nuclei of said sample and producing a characteristic signal in accordance with said absorbed energy, means for applying said characteristic signal as a first input to said recording means, a reference sample disposed within said first magnetic field, means for producing a second signal having a second frequency which is correlated to the nuclear resonance frequency of said reference sample, means for combining said first and second signals to derive a control signal proportional to the difference of said first and second frequencies, and means for applying said control signal as a second input to said recording means for causing a displacement of said recording means along one axis thereof.

8. Apparatus for recording nuclear resonance spectra of a sample of matter comprising means for producing a first unidirectional magnetic field of substantially constant intensity, means for producing a second magnetic field alternating at a high frequency and substantially orthogonal to the direction of said first field, said sample being disposed within said first and second magnetic fields, means for varying at least one of the predetermined respective parameters of said first and second field producing means, said parameters comprising the field intensity of said first field producing means and the frequency of said second field producing means, means for recording the energy absorbed by the nuclei of said sample as a function of the one of said parameters being varied, means for generating a first signal of a first frequency equal to the frequency of said alternating magnetic field, means for detecting the energy absorbed by the atomic nuclei of said sample and producing a characteristic signal in accordance with said absorbed energy, means for applying said characteristic signal as a first input to said recording means, a reference sample disposed within said first magnetic field and having a nuclear resonance frequency correlated to the intensity of said first magnetic field, means for generating a second signal of a second frequency which is equal to the nuclear resonance frequency of said reference sample, means for comparing said first and second signals to derive a control signal proportional to the difference of said first and second frequencies, means for applying said control signal as a second input to said recording means for causing a displacement of said recording means along one axis by an amount proportional to the value of said control signal.

References Cited in the file of this patent

UNITED STATES PATENTS

| | | |
|---|---|---|
| 2,837,649 | Hershberger | June 3, 1958 |
| 2,845,595 | Leete | July 29, 1958 |
| 2,955,252 | Williams | Oct. 4, 1960 |

OTHER REFERENCES

Baker et al.: The Review of Scientific Instruments, vol. 28, No. 5, May 1957, pp. 313 to 321 incl.